Patented Nov. 23, 1948

2,454,753

UNITED STATES PATENT OFFICE 2,454,753

INOCULUM AND PROCESS OF PREPARING AND USING SAME

Floyd D. Hager, Pearl River, N. Y., assignor, by mesne assignments, to American Cyanamid Company, New York, N. Y., a corporation of Maine No Drawing. Application May 20, 1944, Serial No. 536,609

8 Claims. (Cl. 195—56)

This invention relates to a new inoculum and to a process of preparing and using the same. More particularly, the invention relates to the preparation and use of a new kind of inoculum which has been found to be useful in the inoculation of nutrient growth media with surface-growing fungi, bacteria, or other microorganisms and spores thereof.

Certain fermentation processes which are carried out on a commercial scale employ surface-growing microorganisms. Fermentation processes of this type are usually started by seeding a suitable sterile, liquid growth medium with the desired microorganisms or, more often, their spores. The success of these processes depends in considerable measure upon obtaining a uniform and evenly distributed growth of the organism upon the surface of its growth medium. Since most surface-growing organisms are aerobic in nature, it is essential that the seed organisms be distributed on the surface of the growth medium and not below the surface. It is also essential that the seed organisms be uniformly distributed so that there are no bare spots.

Ordinarily, large-scale fermentations are started by transferring viable spores, or the organism itself, from the surface of a culture growth, such as an agar slant, to the growth medium. Transfer of the spores by a conventional laboratory inoculating needle is slow, wasteful of spores, and impractical from a commercial point of view. When it is understood that most spores are extremely small, and a small fraction of a milligram of spore material can seed many square feet of surface area, the difficulties of the problem of obtaining uniform distribution of the spores over the growth surface can be appreciated. Many types of spores are not readily wet by water and have a tendency to clump, giving very uneven distribution. Many of those that are thoroughly wet sink and do not grow.

It has been proposed heretofore to transfer spores from a surface culture to a carrier substance, such as bran, chaff, or sawdust, and then introduce this latter spore-bearing material to the growth medium. While such technique speeds up the inoculation process, the use of materials of this type has a number of serious disadvantages. By nature, materials of the type just mentioned are unclean and present a constant source of danger through introduction of foreign organisms, or other contaminants, into the fermentation process. It has also been found that these materials tend to become waterlogged and sink in a liquid growth medium, carrying with them the spores and the material growing thereon. Once below the surface of the liquid, the growing organisms cannot obtain their requirements of air, and growth is stopped. Inocula of this type also absorb substantial quantities of the fermentation liquor and either decrease the yield of fermentation product or necessitate extraction thereof to obtain the valuable principals of the fermentation liquor.

The present invention is based upon my discovery that conventional methods of transferring spores and other viable organisms from one growth medium to another can be greatly improved by using a new kind of inoculum having as a spore carrier certain substances having properties which will be fully described hereinafter. The spore-carrying medium which may make up a large proportion of the inoculum of the present invention is a material which can stand sterilization temperatures, i. e., 115° C. or higher, without melting or decomposing. It is non-poisonous and does not retard or otherwise interfere with the growth of the organism to be grown. It is also desirable that the spore-transfer material have the ability to pick up and hold viable spores while transferring them from the culture to the growth medium.

The preferred transfer material is also water-insoluble, or at least slowly soluble, and should have the property of floating when distributed over the surface of the growth medium. This does not necessarily mean that the spore-bearing material shall have a specific gravity less than that of the culture medium, since the surface tension of the nutrient liquor is sufficient in many cases to hold the spore-bearing material on the surface when deposited thereon. The spore-bearing material should also have the property of spreading upon the surface of the growth liquor. It should also be capable of being powdered or subdivided to such a small size that it may be dusted or blown in a cloud-like formation over the growth medium, which then settles uniformly on the surface. It is also desirable, but not necessary, that the spore-bearing material be light-colored, so that its distribution over the surface of the darker growth medium may be observed, thus enabling the operator to judge the amount and efficiency of the inoculant on the surface of the growth medium.

Although there are a number of substances which possess the above-named properties and which are therefore qualified to act as carriers for the seeding microorganisms, in accordance with the principles of my invention I have found that certain of the alkali metal and alkaline earth metal salts of the saturated fatty acids having from 12 to 18 carbon atoms inclusive are particularly suitable. Of these, calcium stearate has been found to be highly satisfactory and useful for this purpose. This latter compound is practically white; it may be easily powdered and then sterilized without fusing. It readily picks up seed spores and holds them while inoculation is taking place. The spore-bearing, powdered calcium stearate can be blown or otherwise distributed over the surface of a liquid growth substrate. Upon falling on the surface of the liquid, the powdered calcium stearate rapidly distributes itself uniformly over the surface thereof. When it is in a powdered form, practically none of it sinks, thereby carrying spores below the surface of the liquid. It is water-insoluble and does not dissolve in the nutrient liquor. It does not interfere with the growth of the organisms for which it was used as a transfer medium.

Of course, other alkali metal and alkaline earth metal salts of saturated fatty acids having from 12 to 18 carbon atoms inclusive, which have melting points above sterilizing temperatures, about 115° C., may also be used. Among these are the calcium, barium, lithium, potassium, and sodium salts of myristic acid, palmitic acid, lauric acid, and stearic acid. The magnesium, potassium, and sodium salts of some of these acids, particularly the technical grades, have melting points that are below some sterilizing temperatures but can be used when absolutely sterile conditions are not necessary. These salts are also more water-soluble than the calcium and barium salts but otherwise possess most of the necessary properties for preparing my new inoculum.

In preparing and using my new inoculum, the desired fatty acid soap is finely divided and then sterilized at temperatures depending upon its subsequent use. For example, technical calcium stearate is autoclaved at 115–120° C. for a sufficient time to sterilize the product, the length of time required being governed by the size and kind of container. Most technical grades fuse at lower temperatures than the pure salt, and it is necessary to use a product sufficiently pure to withstand sterilizing temperatures without melting. The impurities in most cases are the salts of other fatty acids and, except for causing a change of melting point, are as useful as calcium stearate itself. Other chemical or physical means of sterilizing the powder may be used, providing that the treatment does not chemically or physically modify the nature of the powdered salt to such an extent as to make it unsatisfactory for its intended purpose.

To transfer viable spores, or organisms, to the powdered carrier, I merely place a quantity of the dry, sterilized powder on the surface growth and agitate the powder to transfer the spores, or other organisms, to the powdered material. To expedite this I frequently add to the powdered material insert solid objects of from about 1/16 of an inch to ½ inch in diameter. Glass beads, pebbles, metal particles, etc., have been found to be satisfactory. These objects help materially in dislodging the spores and relocating them on the fatty acid salt particles. After the surface-growing spore-bearing material has been agitated with the powdered salt and glass beads, etc., the latter are removed by screening, and the powdered inoculum is ready for use.

To inoculate a nutrient growth medium with my new inoculum, I usually dust, by means of any one of several types of dusting devices, a quantity of the spore-bearing powder over the surface of the nutrient growth liquor. The dusted powder settles uniformly over the surface of the liquid, and growth of the microorganism is then allowed to take place. The growing of the organism is conducted in the usual manner, the fatty acid salt having no noticeable effect upon the normal course of the organism's development under otherwise analogous conditions. Since the fatty acid salt particles are relatively cheap and as they do not absorb any substantial quantity of the fermentation liquor, there is no necessity of recovering them.

Inocula of the type described herein are particularly useful in conjunction with fermentation processes involving the transfer of spores of surface-growing molds, particularly those of the family *Aspergillaceae* which includes the genera *Penicillium* and *Aspergillus*. My inoculum has been used very successfully in seeding nutrient growth liquors with spores of *Penicillium notatum*. The present invention is also adapted to transfer other surface-growing fungi, bacteria, and yeast cells, or spores of such, to suitable solid or liquid growth media. Suitable inocula may be prepared from surface growths in the manner described hereinabove.

It will be understood, of course, that inert material, or even food substances for the organism, may be added to the inoculum without departing from the essential and novel features thereof as set forth in the appended claims.

I claim:

1. A dry powdered inoculum comprising a finely-divided saturated fatty acid salt of the group consisting of alkali metal and alkaline earth metal salts of saturated fatty acids having from 12 to 18 carbon atoms inclusive, said salt having a melting point of at least 120° C., and viable spores of a single species of a mold in contact therewith.

2. A dry powdered inoculum comprising finely-divided sterile calcium stearate in intimate contact with viable spores of *Penicillium notatum*.

3. The method of preparing an inoculum which comprises sterilizing by heating to a temperature of at least 115° C. without melting a finely-divided compound of the group consisting of alkali metal and alkaline earth metal salts of saturated fatty acids having from 12 to 18 carbon atoms inclusive, said compound having a melting point of at least 120° C., and agitating said finely-divided sterilized fatty acid salt with the spores of a surface-growing mold to obtain an inoculum comprising a finely-divided fatty acid salt having viable spores of a single mold species deposited on the particles thereof.

4. A method of preparing an inoculum which comprises contacting sterilized, finely-divided calcium stearate with the viable spores of *Penicillium notatum*.

5. A method of inoculating a nutrient growth medium with a mold spore which comprises the steps of agitating a sterile finely-divided compound of the group consisting of alkali metal and alkaline earth metal salts of saturated fatty acids having from 12 to 18 carbon atoms inclusive said compound having a melting point of at least 120° C. over a surface having viable mold spores of a single species thereon to contact the spores with the said particles and thereafter dusting the mold spores-bearing particles over the surface of a nutrient growth medium.

6. A dry powdered inoculum comprising finely divided particles of calcium stearate, said particles having on the surface thereof viable mold spores of a single species.

7. A dry powdered inoculum comprising finely divided particles of calcium stearate, said particles having on the surface thereof viable spores consisting of those of one of the species of the genus *Penicillium*.

8. A dry powdered inoculum comprising finely divided particles of calcium stearate, said particles having on the surface thereof viable spores consisting of those of the species *Penicillium notatum* only.

FLOYD D. HAGER.

REFERENCES CITED

The following references are of record in the file of this patent:

UNITED STATES PATENTS

| Number | Name | Date |
|---|---|---|
| 525,822 | Takamine | Sept. 11, 1894 |
| 1,166,387 | Ramage | Dec. 28, 1915 |
| 1,260,899 | Harris | Mar. 26, 1918 |
| 1,608,390 | Holland | Nov. 23, 1926 |
| 1,833,716 | Kluyver | Nov. 24, 1931 |
| 1,891,750 | Cornell | Dec. 20, 1932 |
| 2,033,326 | Clark | Mar. 10, 1936 |
| 2,083,065 | Heyl | June 8, 1937 |
| 2,376,333 | Ark | May 22, 1945 |

OTHER REFERENCES

Rabbeno, Chemical Abstracts, vol. 22, 1928, page 1395.

Coghill, Progress Report No. 14, Sept. 6, 1943, pages 1 to 3. Distributed by Committee on Medical Research, O. S. R. D.